US010855770B2

(12) United States Patent
Jain et al.

(10) Patent No.: US 10,855,770 B2
(45) Date of Patent: *Dec. 1, 2020

(54) DEPLOYING AND MANAGING CONTAINERS TO PROVIDE A HIGHLY AVAILABLE DISTRIBUTED FILE SYSTEM

(71) Applicant: Verizon Patent and Licensing Inc., Arlington, VA (US)

(72) Inventors: Kapil Jain, Bedford, NH (US); Manish Chugtu, Bedford, MA (US); Subhajit Mukherjee, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,206

(22) Filed: May 29, 2019

(65) Prior Publication Data

US 2019/0349429 A1 Nov. 14, 2019

Related U.S. Application Data

(63) Continuation of application No. 15/462,153, filed on Mar. 17, 2017, now Pat. No. 10,341,438.

(51) Int. Cl.
*H04L 12/24* (2006.01)
*H04L 12/26* (2006.01)
(Continued)

(52) U.S. Cl.
CPC .......... *H04L 67/1097* (2013.01); *G06F 11/07* (2013.01); *G06F 11/30* (2013.01);
(Continued)

(58) Field of Classification Search
CPC .......... H04L 41/00; H04L 41/04; H04L 41/06; H04L 41/0654; H04L 41/08;
(Continued)

(56) References Cited

U.S. PATENT DOCUMENTS 6,438,749 B1 8/2002 Chamberlain
7,237,239 B1 6/2007 Goel
(Continued)

OTHER PUBLICATIONS

REX-Ray, "REX-Ray Openly serious about storages," https://rexray.readthedocs.io/en/stable/, Dec. 2, 2016, 4 pages.
(Continued)

*Primary Examiner* — Michael A Keller
*Assistant Examiner* — Boris D Grijalva Lobos

(57) ABSTRACT

A device can receive information indicating a set of instructions associated with a microservices application, where the microservices application is associated with one or more microservices. The device can generate a deployment specification. The device can deploy one or more containers and one or more replicate containers. The one or more containers and the one or more replicate containers are associated with the one or more microservices. The one or more containers and the one or more replicate containers can be associated with a distributed file system. The device can receive information associated with modifying the one or more microservices. The device can modify the one or more microservices, as one or more modified microservices, based on receiving the information associated with modifying the one or more microservices. The device can deploy the one or more modified microservices.

20 Claims, 7 Drawing Sheets

(51) Int. Cl.
*H04L 29/08* (2006.01)
*G06F 11/30* (2006.01)
*G06F 11/07* (2006.01)
*G06F 16/00* (2019.01)
*G06F 16/182* (2019.01)

(52) U.S. Cl.
CPC ............ *G06F 16/00* (2019.01); *G06F 16/182* (2019.01); *H04L 41/0668* (2013.01); *H04L 41/082* (2013.01); *H04L 41/0896* (2013.01); *H04L 43/08* (2013.01); *H04L 41/12* (2013.01)

(58) Field of Classification Search
CPC ..... H04L 41/0893; H04L 41/12; H04L 41/50; H04L 41/5041; H04L 41/5054; H04L 67/00; H04L 67/10; H04L 67/1002; H04L 43/00; H04L 43/08; G06F 11/00; G06F 11/008; G06F 11/07; G06F 11/30; G06F 11/3051; G06F 11/3055
See application file for complete search history.

(56) References Cited

U.S. PATENT DOCUMENTS

| | | | |
|---|---|---|---|
| 7,496,661 B1 | 2/2009 | Morford |
| 7,516,367 B1 | 4/2009 | Beltowski |
| 7,843,843 B1 | 11/2010 | Papp |
| 8,533,133 B1 | 9/2013 | Singliar |
| 8,832,235 B1 | 9/2014 | Rozhin |
| 9,692,811 B1 | 6/2017 | Tajuddin |
| 9,898,272 B1 | 2/2018 | Benameur |
| 10,127,030 B1 | 11/2018 | Mortman |
| 2003/0233648 A1 | 12/2003 | Earl |
| 2004/0260718 A1 | 12/2004 | Fedorov |
| 2005/0091354 A1 | 4/2005 | Lowell |
| 2006/0075076 A1 | 4/2006 | Sinha |
| 2006/0080424 A1 | 4/2006 | Sun |
| 2008/0178169 A1 | 7/2008 | Grossner |
| 2009/0132708 A1 | 5/2009 | Hayward |
| 2011/0035738 A1 | 2/2011 | Toeroe |
| 2013/0036237 A1 | 2/2013 | Mutisya |
| 2014/0195662 A1 | 7/2014 | Pulipakkam |
| 2014/0282469 A1 | 9/2014 | Johnson |
| 2017/0187785 A1 | 6/2017 | Johnson |
| 2017/0214550 A1 | 7/2017 | Kumar |
| 2017/0244787 A1 | 8/2017 | Rangasamy |
| 2017/0331812 A1 | 11/2017 | Lander |
| 2017/0364434 A1 | 12/2017 | Kairali |
| 2018/0032534 A1 | 2/2018 | Koerner |
| 2018/0088935 A1 | 3/2018 | Church |
| 2018/0107586 A1 | 4/2018 | Vyas |
| 2018/0136931 A1 | 5/2018 | Hendrich |
| 2018/0164791 A1 | 6/2018 | Debes |
| 2018/0198845 A1 | 7/2018 | Kulp |
| 2018/0270107 A1 | 9/2018 | Nassar |

OTHER PUBLICATIONS

ClusterHQ, "What Is Flocker?," https://clusterhq.com/flocker/introduction/, Jun. 17, 2015, 6 pages.

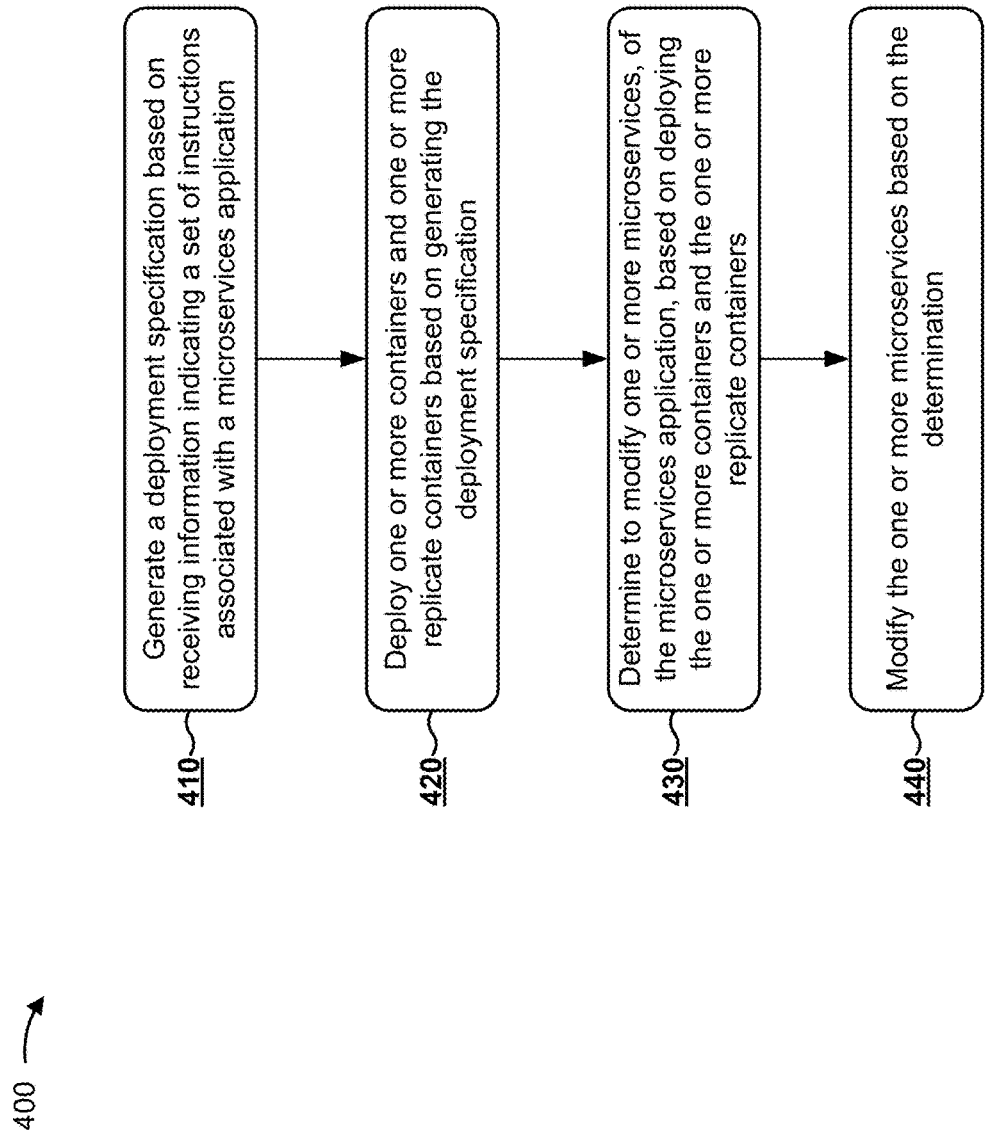

DEPLOYING AND MANAGING CONTAINERS TO PROVIDE A HIGHLY AVAILABLE DISTRIBUTED FILE SYSTEM

RELATED APPLICATION

This application is a continuation of U.S. patent application Ser. No. 15/462,153, filed Mar. 17, 2017, which is incorporated herein by reference.

BACKGROUND

A microservices architecture can refer to a software application that includes a suite of independently deployable and modular applications that each executes a unique process and that interact to achieve an overall functionality of the software application.

BRIEF DESCRIPTION OF THE DRAWINGS

FIG. 4 is a flow chart of an example process for providing a highly available distributed file system based on deploying and managing containers within a cloud platform.

DETAILED DESCRIPTION OF PREFERRED EMBODIMENTS

The following detailed description of example implementations refers to the accompanying drawings. The same reference numbers in different drawings can identify the same or similar elements.

A microservices application can include an application that includes a set of applications (e.g., microservices) that each performs a particular functionality of the microservices application, and that each interacts to perform an overall functionality of the microservices application. Microservices, of the microservices application, can be independently scalable. That is, a first microservice can be associated with a first number of instances that are executing, a second microservice can be associated with a second number of instances that are executing (where the second number is independent of the first number), etc.

In some cases, a microservices application can be hosted by one or more servers using one or more containers (e.g., one or more self-contained execution environments). For example, a microservices application can deploy a container for each microservice within the microservices application. However, supporting a microservices application with a distributed file system that persists the physical data storage can require specialized hardware. For example, deployment and maintenance of the microservices application can require use of vendor-specific hardware, which can cause issues without access to proprietary information relating to the specialized hardware.

Implementations described herein provide for a cloud platform to support a distributed file system that persists data by intelligently deploying and managing one or more containers and one or more replicate containers. For example, the cloud platform can upgrade or downgrade one or more microservices, adjust network capacity by modifying one or more microservices, add one or more replicate containers to provide redundancies, or the like. In this case, the cloud platform can modify the one or more microservices without any indication to a user that the hosted microservices application has changed (e.g., a user can access the microservices application seamlessly despite backend activity, such as an upgrade, a node failure, etc.). In this way, the cloud platform reduces costs by eliminating a need for specialized hardware, and improves scalability and availability by providing persistent data and redundancy measures.

Figure 1A:
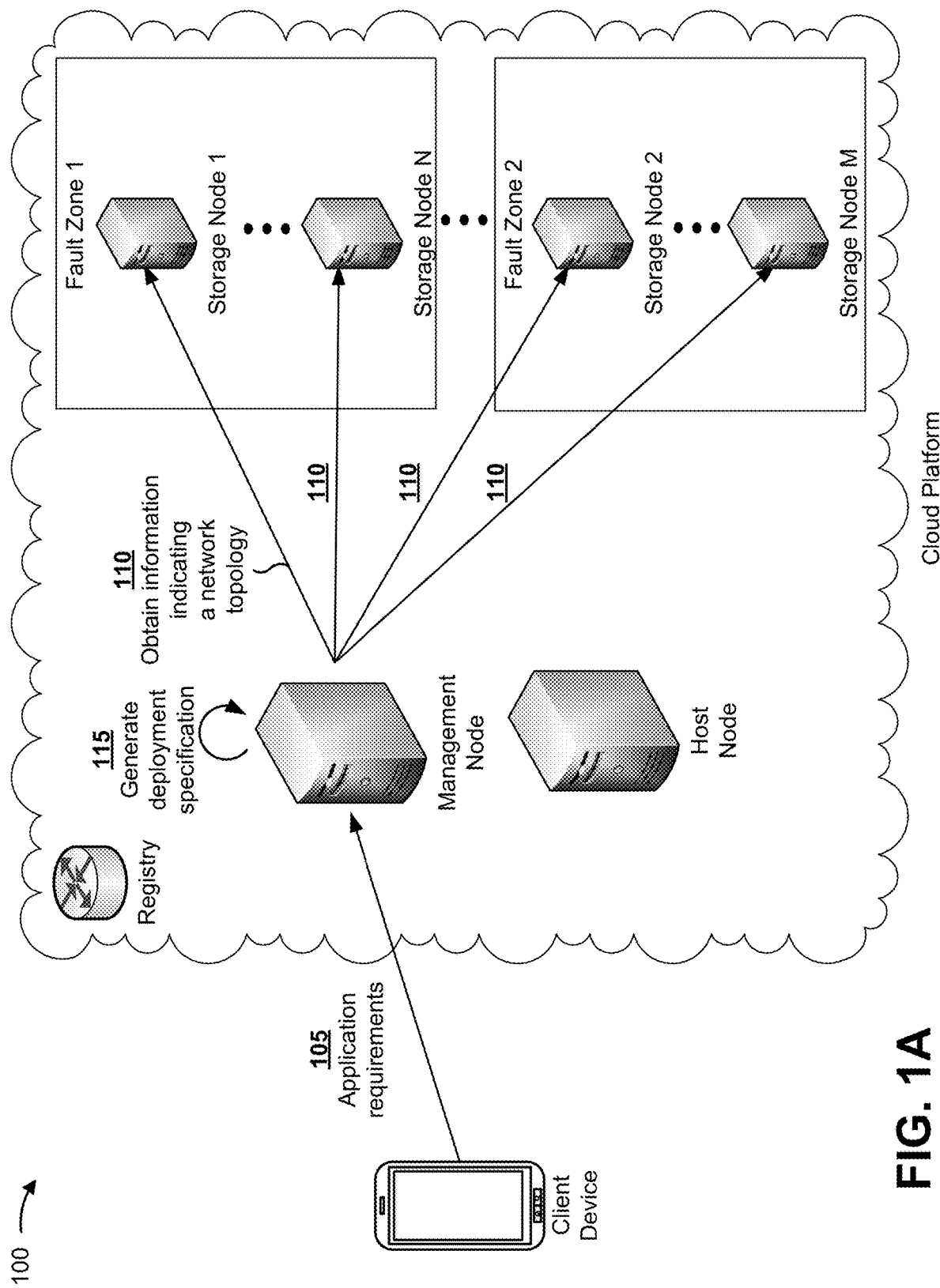
FIGS. 1A-1D are diagrams of an overview of an example implementation described herein.

FIGS. 1A-1D are diagrams of an overview of an example implementation 100 described herein. As shown in FIGS. 1A-1D, example implementation 100 shows a microservices application hosted on a cloud platform. As shown in FIG. 1A, example implementation 100 can include a client device and the cloud platform, and the cloud platform can include a management node, a host node, one or more groups of storage nodes (shown as two groups, a group that includes storage node 1 to storage node N, and a group that includes storage node 2 to storage node M), and a registry.

As shown by reference number 105, the management node can receive, from the client device, a set of instructions indicating requirements for hosting the microservices application. The requirements can include information indicating an amount of capacity needed to host the microservices application, information indicating a replication factor to identify a quantity of backup instances of the microservices application to deploy (e.g., to provide a more reliable microservices application), information indicating a deployment date and/or a deployment duration, or the like.

As shown by reference number 110, the management node can obtain, from the one or more groups of storage nodes, information relating to a network topology. For example, the management node can communicate with the one or more groups of storage nodes, and, from each node, obtain information relating to a network topology. Information relating to the network topology can include an internet protocol (IP) address to identify a storage node, one or more port numbers associated with a storage node, information identifying components associated with a storage node (e.g., a memory type, such as a hard desk drive (HDD), a solid state drive (SSD), etc., a processor type, or the like), fault zone information (e.g., a group of nodes can be associated with a particular switch, a particular power supply, a particular chassis, a particular rack, a particular data center, or the like, and the group of nodes can be identified as in the same fault zone), or the like.

As shown by reference number 115, the management node can generate a deployment specification (determine to host a microservices application) based on receiving the application requirements and based on obtaining the information indicating the network topology. For example, the management node can generate a deployment specification that can be used to select one or more groups of nodes to host the microservices application, and can further be used to select an amount of resources to be used by the one or more groups of nodes. By generating a deployment specification based on both the application requirements and the information indicating the network topology, the management node is able to schedule a deployment of containers and replicate containers that will efficiently utilize cloud resources (e.g., relative to deploying containers and replicate containers without the information indicating of the network topology, which can lead to an uneven distribution of resources).

Figure 1B:
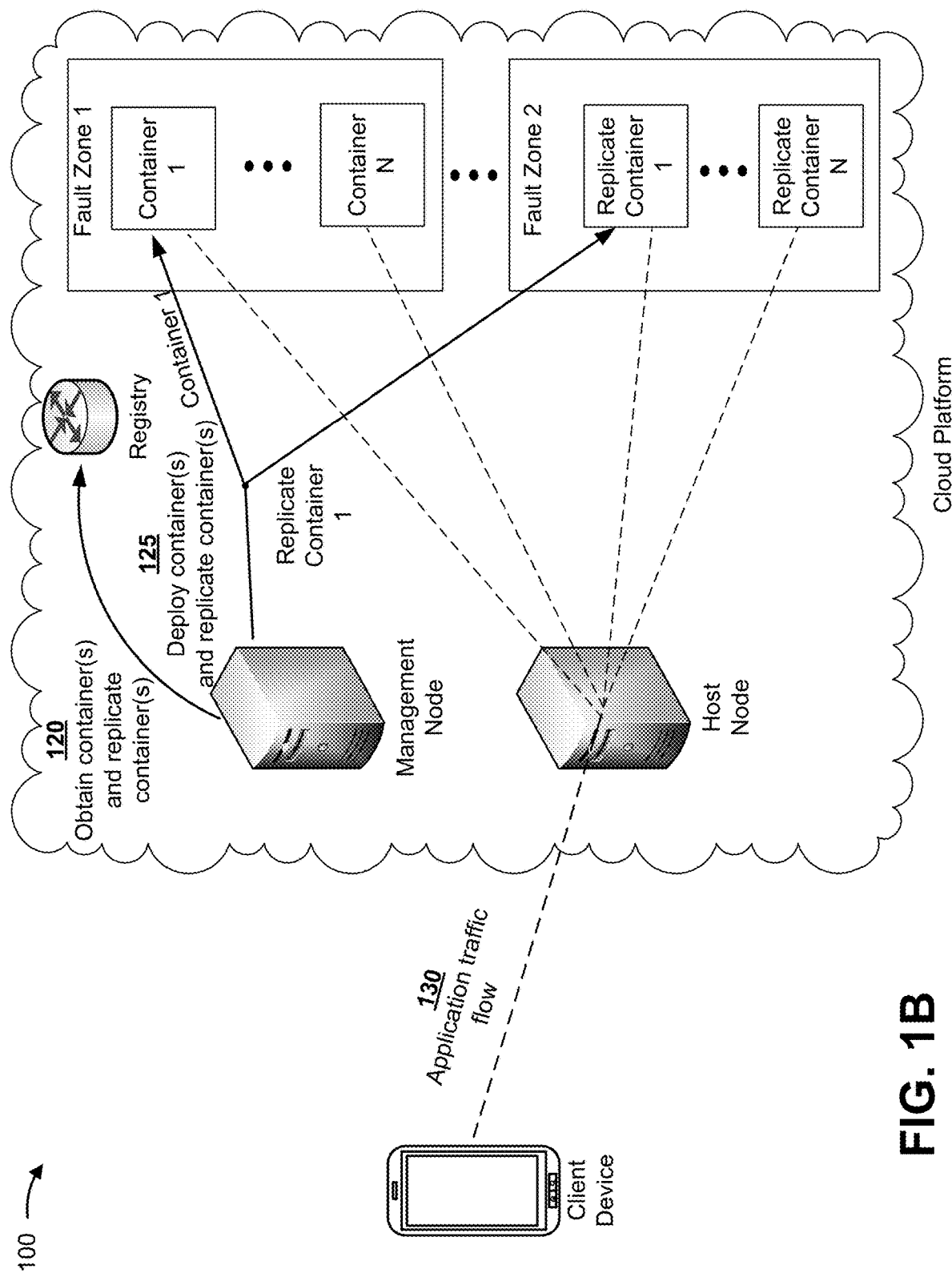

As shown in FIG. 1B, and by reference number 120, the management node can obtain, from the registry, one or more containers and one or more replicate containers based on the deployment specification. For example, the deployment specification can indicate a quantity of microservices associated with the microservices application, and can indicate an amount of data that the microservices can consume. In this case, if the deployment specification indicates a replication factor of two (indicating that a client associated with the client device requests to have one duplicate instance of data associated with the microservices application), then the management node can query the registry to obtain, for each microservice associated with the microservices application, one container and one replicate container (e.g., a microservice can be hosted by container 1 and replicate container 1).

As shown by reference number 125, the management node can deploy, to the one or more groups of storage nodes, the one or more containers and the one or more replicate containers (shown as container 1 to container N and replicate container 1 to replicate container N). In some cases, the management node can deploy a container, of the one or more containers, and a replicate container, of the one or more replicate containers, on different fault zones (shown as deploying container 1 on a storage node in fault zone 1 and deploying replicate container 1 on a storage node in fault zone 2). As shown by reference number 130, the application can deploy, causing all (or some) of the nodes hosting the microservices application to connect to an underlying distributed file system that is supported by the one or more containers and/or the one or more replicate containers.

The deployment can allow the client device to access the application, causing a traffic flow of data. In this case, the host node can handle traffic to and/or from the client device, and can perform application programming interface (API) calls to the one or more groups of storage nodes to execute instructions (e.g., functions) associated particular microservices. In this case, input-output (I/O) operations associated with the traffic flow can be stored by the distributed file system that is supported by the one or more containers and/or the one or more replicate containers, as described further herein.

By deploying the one or more containers and the one or more replicate containers based on the deployment specification, the management node efficiently and effectively allocates cloud resources. Furthermore, by deploying the one or more replicate containers on computing nodes associated with a fault zone that is different than a fault zone associated with the one or more containers, the management node ensures that data associated with the microservices application will persist, thereby providing high reliability.

Figure 1C:
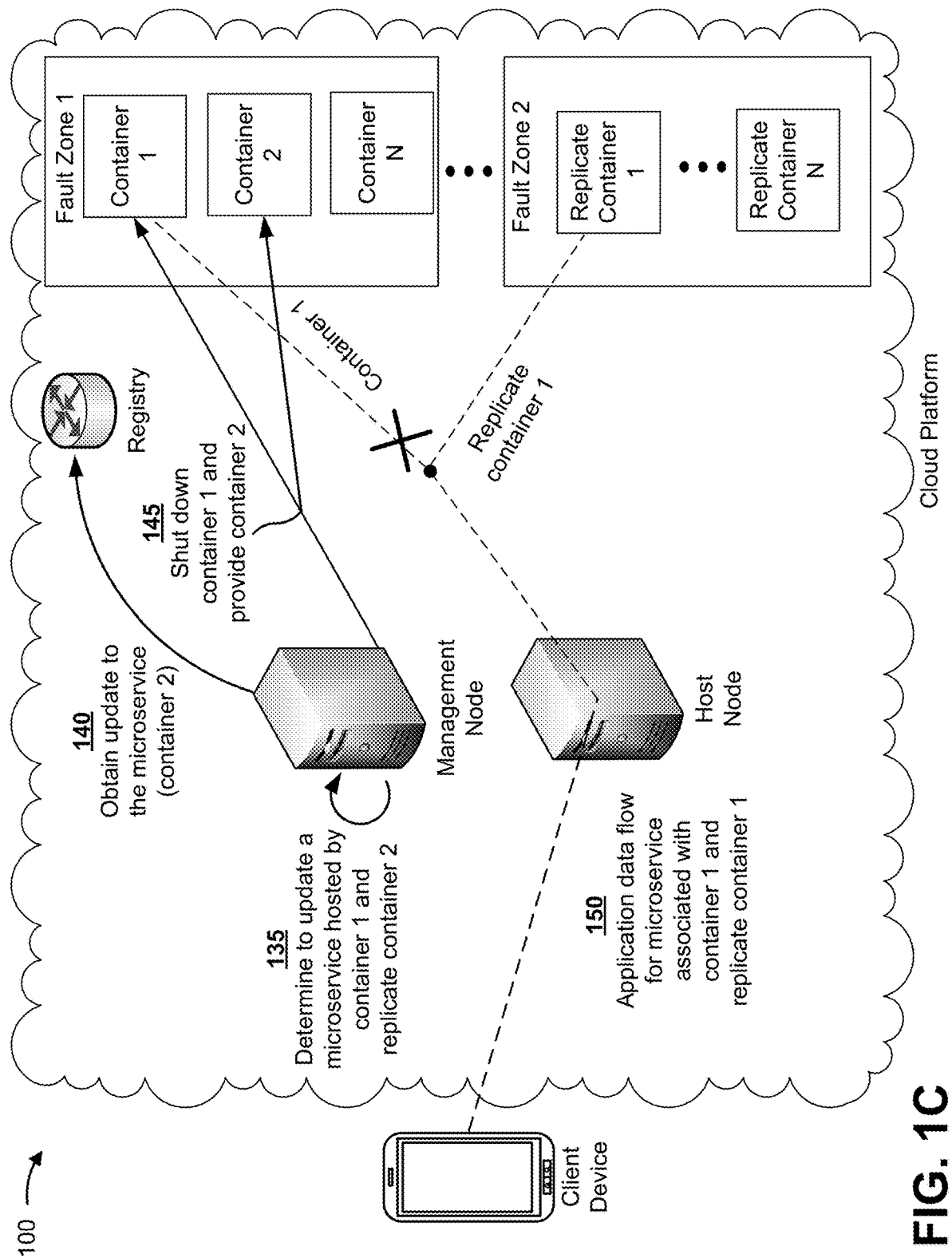

As shown in FIG. 1C, and by reference number 135, the cloud platform (e.g., the management node, the host node, etc.) can determine to upgrade a microservice of the microservices application. As shown, the microservice can be hosted by container 1 and replicate container 1. In this case, if an additional feature of the microservices application is to be released, then the management node can determine to upgrade the microservice. As shown by reference number 140, in some cases, the management node can obtain, from the registry, the upgrade to the microservice that includes the version 2.0 code. For example, the upgrade to the microservice can be supported by a new container, called container 2.

As shown by reference number 145, the management node can provide, to the node that is hosting the microservice, an instruction to shut down container 1. For example, the management node can shut down container 1 to allow container 1 to be replaced with a different container (e.g., container 2) that includes the version 2.0 code of the upgraded microservice. As shown by reference number 150, because container 1 is shut down, traffic flow associated with the microservice can be sent from the host node to replicate container 1 (instead of, or in addition to, container 1). By deploying one or more replicate containers (e.g., that are included in the containers that collectively support the distributed file system), the management node can upgrade the microservices application in a manner that persists data while making the upgrade operation transparent to the client device.

Figure 1D:
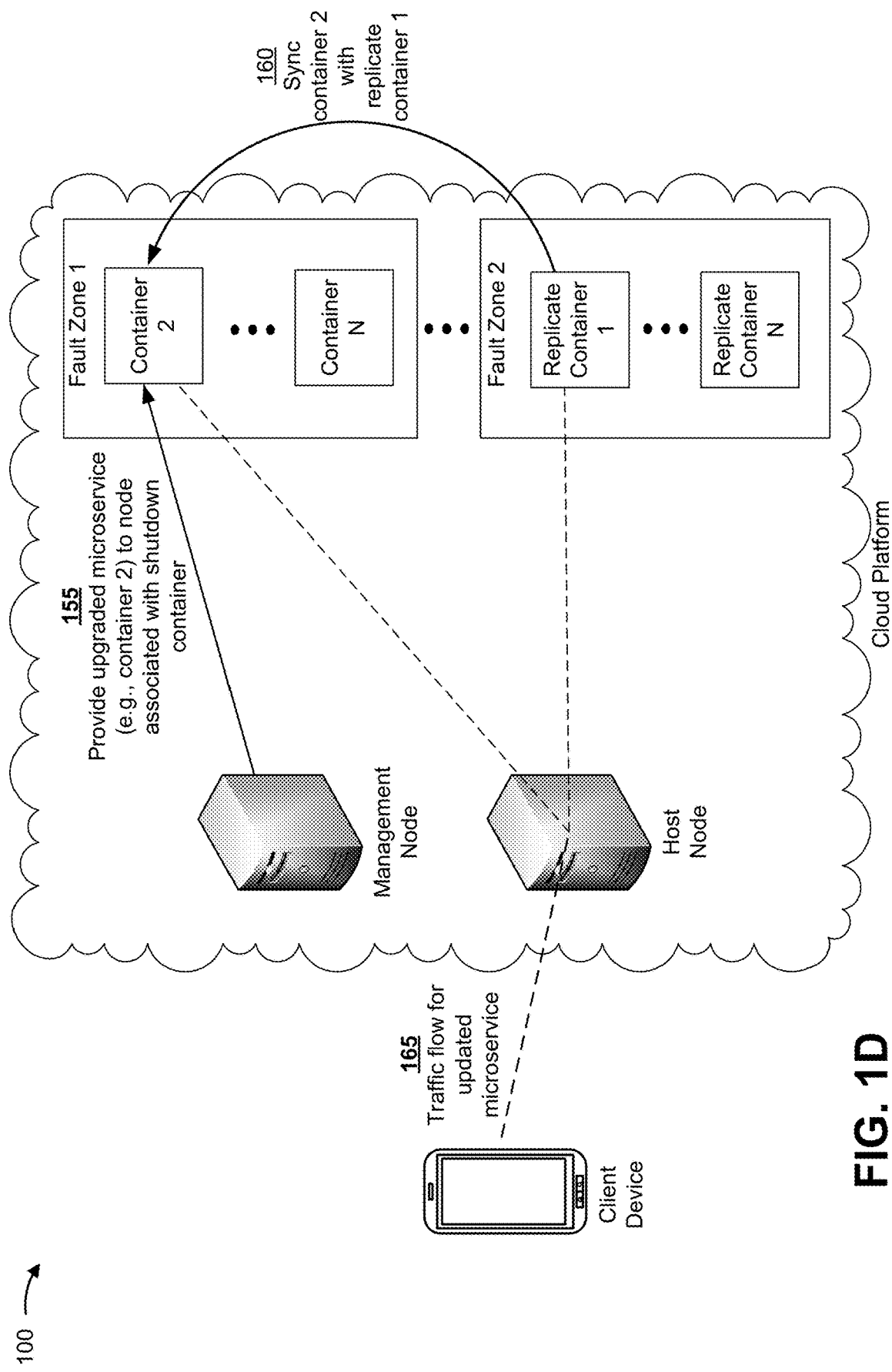

As shown in FIG. 1D, and by reference number 155, the management node can provide the upgraded microservice to the computing node associated with the shut-down container. As shown by reference number 160, replicate container 1 can sync to container 2. In this case, metadata and data associated with the traffic flow that occurs during the upgrade (e.g., while container 1 is offline) can be sent to container 2. As shown by reference number 165, container 2 and replicate container 1 can support traffic flow for the upgraded microservice. For example, I/O operations associated with the traffic flow can be stored using the underlying distributed file system that is supported, in part, by container 2 and replicate container 1. In this way, the management node is able to persist data while upgrading the microservice, thereby providing high reliability.

As indicated above, FIGS. 1A-1D are provided merely as an example. Other examples are possible and can differ from what was described with regard to FIGS. 1A-1D. For example, other implementations can use the management node as the proxy (instead of the host node).

Figure 2:
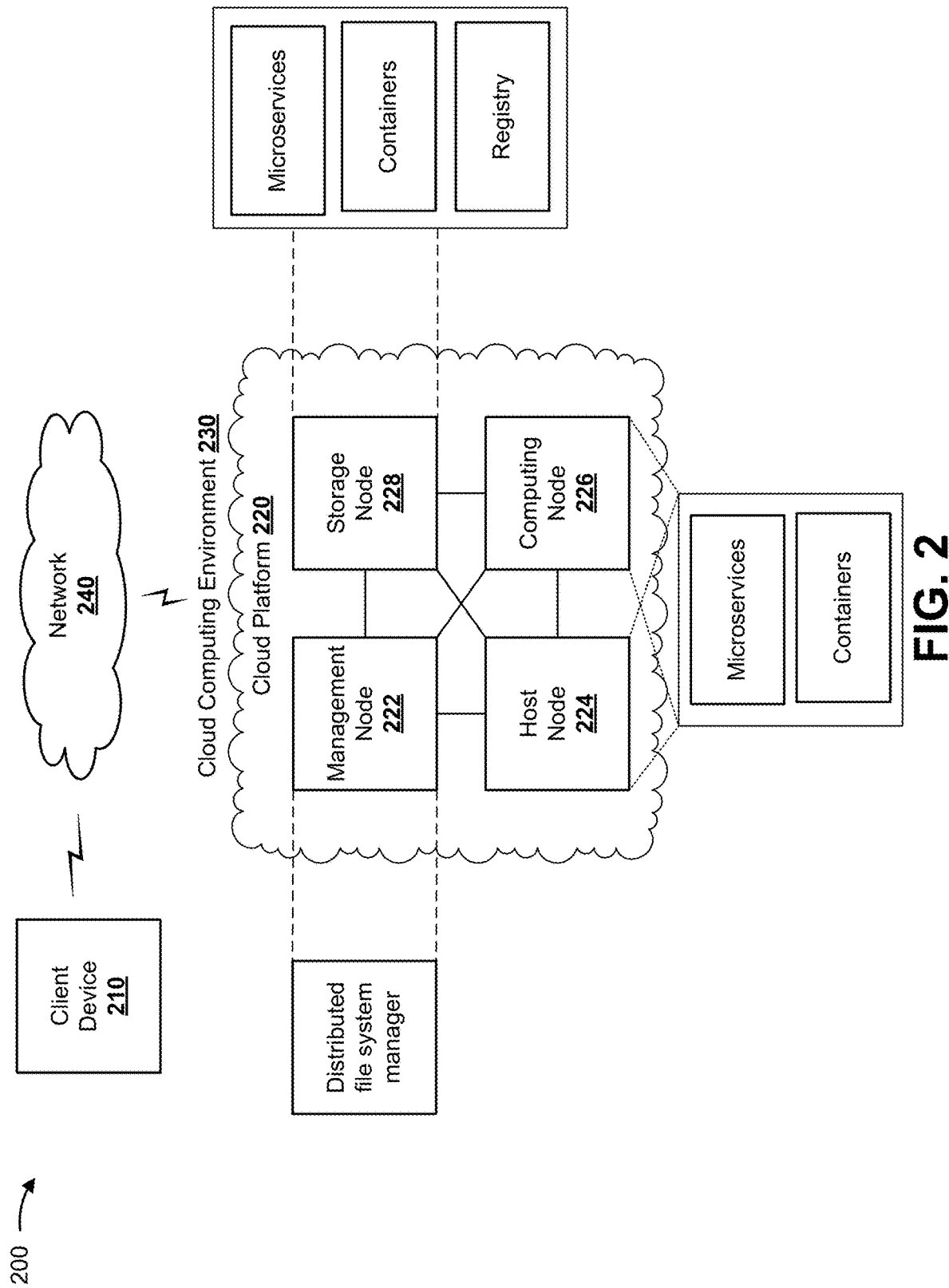
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include client device 210 and cloud platform 220. Cloud platform 220 can include a group of nodes, such as one or more management nodes 222, host nodes 224, computing nodes 226, and/or storage nodes 228. Devices of environment 200 can interconnect via wired connections, wireless connections, or a combination of wired and wireless connections.

Client device 210 includes one or more devices capable of receiving, generating, storing, processing, and/or providing information associated with a microservices application. For example, client device 210 can include a computing device, such as a desktop computer, a laptop computer, a tablet computer, a handheld computer, a server device, a mobile phone (e.g., a smart phone or radiotelephone), or a similar type of device. In some implementations, client device 210 can communicate with management node 222 to provide requirements associated with a microservices application or to request a modification to a microservices application (e.g., a request to upgrade or downgrade a microservice, a request to add or remove capacity from a microservice, etc.). Additionally, or alternatively, client device 210 can access a microservices application while the microservices application is being modified by cloud platform 220. Additionally, or alternatively, client device 210 can communicate with host node 224 to access the microservices application.

Cloud platform 220 includes one or more computing devices capable of deploying, configuring, generating, modifying, and/or providing microservices associated with a microservices application. In some implementations, cloud platform 220 can be designed to be modular such that certain software components can be swapped in or out depending on a particular need. As such, cloud platform 220 can be easily and/or quickly reconfigured for different uses. In some implementations, cloud platform 220 can host a microservices application on a cluster of computing nodes 226 using one or more containers and one or more replicate containers, and the one or more containers and the one or more replicate containers can be configured to treat a microservice (or a task of a microservice), of the microservices application, in a particular way.

In some implementations, as shown, cloud platform 220 can be hosted in cloud computing environment 230. Notably, while implementations described herein describe cloud platform 220 as being hosted in cloud computing environment 230, in some implementations, cloud platform 220 can be based outside of a cloud (i.e., can be implemented outside of a cloud computing environment) or can be partially cloud-based.

Cloud computing environment 230 includes an environment that hosts cloud platform 220. Cloud computing environment 230 can provide computation, software, data access, storage, and/or other services that do not require end-user knowledge of a physical location and configuration of system(s) and/or device(s) that host cloud platform 220. As shown, cloud computing environment 230 can include a group of nodes, such as management node 222, host node 224, computing nodes 226, and/or storage node 228. As further shown, management node 222 can include or implement a distributed file system manager, host node 224 can include or implement one or more microservices and one or more containers, computing node 226 can include or implement one or more microservices and one or more containers, and storage node 228 can include or implement a registry.

While implementations described herein can associate particular functionality with particular nodes, any one of the nodes associated with cloud computing environment 230 can perform any or all of the functionality described herein. Additionally, a single one of these nodes can, in some implementations, be implemented by multiple nodes. Further, a single one of these nodes can be implemented on a single computing device or can be implemented on multiple computing devices.

Management node 222 includes one or more devices capable of storing, deploying, managing, modifying, adding, and/or removing containers and/or replicate containers associated with microservices. In some implementations, management node 222 can communicate with computing nodes 226 (e.g., via API calls) to perform one or more tasks relating to deploying, managing, modifying, adding, and/or removing containers associated with microservices. Additionally, or alternatively, management node 222 can communicate with storage node 228 to obtain one or more containers and one or more replicate containers from the registry. Additionally, or alternatively, management node 222 can store information relating to a network topology of cloud platform 220. Additionally, or alternatively, management node 222 can perform one or more tasks associated with host node 224, as described further herein.

As further shown in FIG. 2, management node 222 includes a cloud resource, such as a distributed file system manager. Distributed file system manager includes one or more instructions capable of being executed by management node 222. For example, the distributed file system manager can include software that, when executed, allows management node 222 to deploy, manage, modify, add, and/or remove one or more containers and/or one or more replicate containers associated with microservices.

Host node 224 includes one or more devices capable of receiving, processing, and/or sending a traffic flow associated with a microservices application. In some implementations, host node 224 can serve as a proxy, and receive, process, and route traffic relating to a microservices application (e.g., via API calls). Additionally, or alternatively, host node 224 can perform load balancing functions, caching functions, or the like, to ensure that cloud platform 220 is capable of supporting a scaling microservices application while maintaining reliability.

Computing node 226 includes one or more devices capable of using containers and/or replicate containers to host microservices. In some implementations, computing node 226 can include multiple computing nodes (referred to as "computing nodes 226"). Additionally, or alternatively, computing node 226 can provide one or more tasks associated with microservices to host node 224 and/or another computing node 226 (e.g., via API calls). In some implementations, computing node 226 can communicate with another computing node 226 to synchronize metadata and data relating to a microservice or a task of a microservice.

As further shown in FIG. 2, host node 224, computing node 226, and/or storage node 228 can include a group of cloud resources, such as microservices, containers, or the like.

Microservices include one or more instructions that can be provided to or accessed by client device 210. In some implementations, microservices can eliminate a need to install and execute the software applications on client device 210. For example, microservices can include software associated with cloud platform 220 and/or any other software capable of being provided via cloud computing environment 230. In some implementations, microservices can communicate with host node 224 to provide data associated with the microservice. Additionally, or alternatively, microservices can communicate with one or more other microservices.

Containers include a self-contained execution environment that executes programs like a physical machine. In some implementations, containers can provide complete support for a microservices application, a microservice, a task of a microservice, or the like. Additionally, or alternatively, containers can share a kernel associated with the host operating system (e.g., the computing node 226 on which the container is deployed). In some cases, in addition to sharing the kernel of the host operating system, containers can share libraries and/or binaries associated with a microservices application, a microservice, a task of a microservice, or the like. Additionally, or alternatively, containers can serve as a backup for one or more other containers (e.g., referred to as replicate containers). In some implementations, the one or more containers and/or the one or more replicate containers can be associated with a distributed file system that provides data storage for the one or more microservices.

Storage node 228 includes one or more devices capable of storing and providing one or more containers and one or more replicate containers associated with microservices. As shown in FIG. 2, storage node 228 can include a cloud resource, such as a registry. Registry includes one or more storage systems and/or one or more devices that use virtualization techniques within the storage systems or devices of storage node 228. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations. In some implementations, the registry can store one or more containers and/or one or more replicate containers. In some cases, a user associated with client device 210 can send (e.g., upload), to the registry, code associated with a microservices application, and the registry can store the code. Additionally, or alternatively, the registry can include network locations of instances of the one or more containers and/or the one or more replicate containers. In some implementations, storage node 228 can communicate with another storage node 228 to synchronize metadata and data relating to a microservice or a task of a microservice.

Network 240 includes one or more wired and/or wireless networks. For example, network 240 can include a cellular network (e.g., a 5G network, a 4G network, such as a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
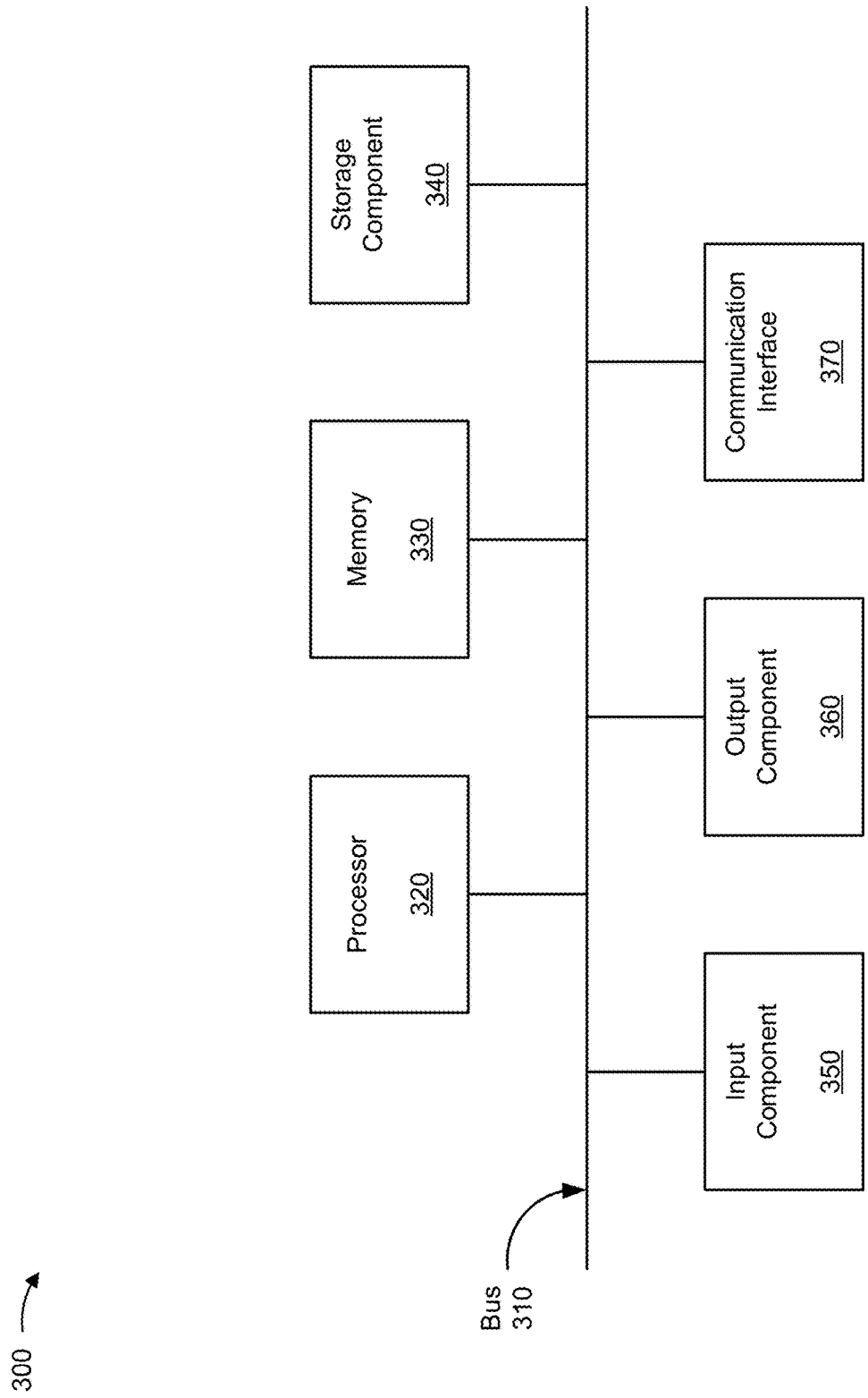
FIG. 3 is a diagram of example components of one or more devices of FIG. 2.

FIG. 3 is a diagram of example components of a device 300. Device 300 can correspond to client device 210, and/or one or more nodes in cloud platform 220, such as management node 222, host node 224, computing node 226, storage node 228, or the like. In some implementations, client device 210, and/or one or more nodes in cloud platform 220, such as management node 222, host node 224, computing node 226, and/or storage node 228 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for providing a highly available distributed file system based on deploying and managing containers within a cloud platform. In some implementations, one or more process blocks of FIG. 4 can be performed by cloud platform 220. In some implementations, one or more process blocks of FIG. 4 can be performed by another device or a group of devices separate from or including cloud platform 220, such as client device 210.

As shown in FIG. 4, process 400 can include generating a deployment specification based on receiving information indicating a set of instructions associated with a microservices application (block 410). For example, management node 222 can receive, from client device 210, a set of instructions associated with a microservices application. The set of instructions can include information indicating one or more requirements associated with deploying the microservices application. For example, the set of instructions can include information indicating an amount of capacity needed to host the microservices application, information indicating a replication factor to identify a quantity of backup instances of the microservices application to deploy, information indicating a deployment date and/or a deployment duration, or the like.

In some implementations, a microservices application can include an application that includes one or more microservices. In some implementations, a microservice can include an application that performs a particular functionality of the microservices application. In some implementations, the microservices application can be associated with hundreds, thousands, etc. of microservices. In other words, microservices can refer to independent applications that interact (e.g., over a network) to perform an overall functionality of the microservices application.

In some implementations, cloud platform 220 can host the microservices application using one or more nodes (e.g., management node 222, host node 224, computing nodes 226, storage node 228, etc.). For example, cloud platform 220 can host the microservices application using one or more nodes that communicate via application programming interfaces (APIs), messaging queues, or the like. As an example, a first microservice can include code to perform a particular task, and if a second microservice has to perform the particular task, the second microservice can make an API call to the first microservice to perform the particular task (rather than having duplicate code). In this way, one or more microservices can perform tasks to achieve overall functionality of the microservices application. Furthermore, by allowing microservices to communicate with other microservices via API calls, cloud platform 220 is able to support the microservices application in a scalable, more efficient way.

In some implementations, a storage node leader can be selected from a group of storage nodes 228. For example, storage nodes 228 included in cloud platform 220 can access a distributed lock manager (DLM), and storage nodes 228 can include an identical copy of a lock database. In some cases, storage nodes 228 can select a storage node 228, of storage nodes 228, to serve as storage node leader that management node 222 can communicate with. By using a DLM to select a storage node 228 to serve as the storage node leader, the storage node leader is able to provide a central location for receiving requests for information associated with the microservices application. Furthermore, use of a DLM provides a way to replace the leader node (e.g., by selecting a different storage node 228, of storage nodes 228, to serve as the leader node) in the event of node failure, thereby improving network reliability. Additionally, or alternatively, a similar process can be carried out to elect a computing node leader.

In some implementations, management node 222 can determine information relating to a network topology. The information relating to the network topology can include information indicating a quantity of nodes in cloud platform 220, one or more IP addresses to identify the quantity of nodes in cloud platform 220, one or more ports identifiers associated with the one or more nodes in cloud platform 220, components relating to the one or more nodes in cloud platform 220 (e.g., a HDD, a SSD, etc.), fault zone information (e.g., particular nodes can be associated with the same fault zone, as described above), or the like. In some implementations, management node 222 can use the information relating to the network topology when generating the deployment specification. Additionally, management node 222 can use the information relating to the network topology to upgrade the microservices application, as described further herein.

In some implementations, management node 222 can determine the information relating to the network topology by obtaining the information from computing nodes 226 and/or storage nodes 228. In some cases, a network administrator can provision management node 222 with the information relating to the network topology. In other cases, computing nodes 226 can be configured to send the information relating to the network topology to management node 222 when computing nodes 226 and/or storage nodes 228 connect to cloud platform 220.

In some implementations, management node 222 can generate a deployment specification based on the set of instructions associated with the microservices application and based on the information indicating the network topology. For example, management node 222 can generate a deployment specification that indicates a manner in which the microservices application is to be deployed within cloud platform 220. In this case, management node 222 can analyze the set of instructions associated with the microservices application and the information relating to the network topology. In some cases, the set of instructions can indicate requirements associated with hosting the microservices application, and the information indicating the network topology can indicate cloud resources available to host the microservices application. Based on this, management node 222 can generate a deployment specification that indicates a quantity of computing nodes 226 and/or storage nodes 228 to assign to host the microservices application, a quantity of resources that each computing node 226 and/or storage node 228 can use in relation to hosting a microservice, or the like.

In some implementations, management node 222 can generate a deployment specification that includes information indicating one or more dependencies relating to the microservices application, configuration information relating to the type of media that can be used for the data storage, or the like. For example, management node 222 can generate a deployment specification that identifies dependencies between microservices. As an example, a microservice can relate to shipping, and a different microservice can relate to billing. When a process occurs involving shipping costs, a computing node 226 that hosts the microservice relating to shipping can make an API call to a different computing node 226 that hosts the microservice relating to billing, to execute the process that involves shipping cost. As another example, management node 222 can generate a deployment specification that identifies a set of storage nodes 228 to host a distributed file system. Additionally, management node 222 can generate a deployment specification that identifies configuration information relating to the type of media used for the storage (e.g., a particular type of media, a quantity of resources that a type of media needs to be provisioned with to support a microservice, etc.).

By generating a deployment specification based on the set of instructions associated with the microservices application and based on the information indicating the network topology, management node 222 is able to deploy containers and replicate containers to computing nodes 226 and/or storage nodes 228 in a manner that maximizes use of computing resources and/or cloud resources. For example, management node 222 can use the information indicating the network topology to determine an amount of resources that are currently distributed among storage nodes 228, and can determine which storage nodes 228 to select for hosting particular containers and particular replicate containers. This conserves cloud resources relative to selecting particular containers and particular replicate containers for deployment without an indication of a current distribution of cloud resources.

As further shown in FIG. 4, process 400 can include deploying one or more containers and one or more replicate containers based on generating the deployment specification (block 420). For example, management node 222 can obtain one or more containers and one or more replicate containers (e.g., from the registry), and management node 222 can deploy the one or more containers and the one or more replicate containers based on the information included in the deployment specification. A container and/or a replicate container can include a self-contained execution environment, with an isolated processor, memory, block input/output (I/O), cloud resources, or the like, and can share a kernel of the host operating system associated with the node (e.g., computing node 226, storage node 228, etc.) to which the container and/or the replicate container is deployed. Additionally, the replicate container can serve as a duplicate instance of the container, thereby providing high data availability and data persistence. In some cases, deployment of the one or more containers and the one or more replicate containers can create a distributed file system on the backend, while client device 210 views the distributed file system as one homogenous application.

In some implementations, a container of the one or more containers can be used to host a microservice of the microservices application. In other implementations, a container can be used to host a task or a subtask of a microservice. Additionally, a replicate container of the one or more replicate containers can serve as a duplicate instance of the container that hosts the microservice. In some implementations, a quantity of replicate containers used to back up the container can be indicated by the deployment specification. As an example, the deployment specification can indicate a replication factor of three, which can result in management node 222 obtaining three instances of a microservice. In this case, one instance of the microservice can be hosted by a container, and the remaining two instances of the microservice can be hosted by two separate replicate containers.

In some implementations, management node 222 can deploy one or more containers, and one or more replicate containers, to nodes (e.g., computing nodes 226, storage nodes 226, etc.) that are located in different fault zones. A fault zone can indicate a zone in which nodes included in the fault zone share one or more network properties (e.g., a fault zone can include storage nodes 228 that access the same network switch, that access the same power supply, that share a same chassis, that share a same rack, that are located in a same data center, etc.). In some cases, management node 222 can deploy a container in a first fault zone, and can deploy one or more replicate containers in one or more second fault zones that are different than the first fault zone.

As an example, assume the deployment specification indicates a replication factor of three. In this case, a microservice, of the microservices application, can be deployed via a container and two replicate containers, resulting in three duplicate instances of data. In this case, the container, and the two replicate containers, can deploy to three separate fault zones. By deploying containers and replicate containers to different fault zones, management node 222 improves reliability by persisting data. For example, if a switch in a fault zone associated with the container malfunctions, the data persists because data associated with the microservice can still be hosted by the two replicate containers that are located in different fault zones (e.g., which are unaffected by the switch malfunction). In this way, the distributed file system that is supported by the one or more containers and the one or more replicate containers persists data to improve reliability and scalability.

In some implementations, prior to deployment, management node 222 can communicate with computing nodes 226 to verify that container dependencies and container configuration settings are correct. For example, management node 222 can verify whether a particular computing node 226 has enough storage space to deploy a particular container. When the verification is complete, the storage can be made available inside the container, allowing the microservice (or a task associated with the microservice) to execute inside of the container. In this way, management node 222 conserves computing resources relative to not verifying container dependencies and container configuration settings (because error correction measures in the event of a mistake would cost more resources than performing a verification).

As further shown in FIG. 4, process 400 can include determining to modify one or more microservices, of the microservices application, based on deploying the one or more containers and the one or more replicate containers (block 430). For example, management node 222 can determine to modify the one or more microservices based on receiving or obtaining information associated with modifying the one or more microservices from client device 210, computing nodes 226, or the like. Additionally, management node 222 can determine to modify the one or more microservices based on monitoring one or more network conditions.

In some implementations, management node 222 can determine to upgrade a microservice of the one or more microservices. For example, management node 222 can monitor one or more network conditions associated with the microservice, and based on monitoring the one or more network conditions can determine to upgrade the microservice.

In some implementations, management node 222 can determine to downgrade a microservice, of the one or more microservices. For example, if management node 222 determines that a particular version associated with the microservice is not satisfying a performance standard, then management node 222 can determine to downgrade the microservice to an older version.

In some implementations, management node 222 can receive, from a node (e.g., computing node 226 and/or storage node 228), information indicating a result of a health check, which can trigger management node 222 to downgrade a microservice of the one or more microservices. For example, a storage node 228 can host a container or a replicate container, and the container or the replicate container can perform a health check associated with the microservice. The health check can indicate one or more performance metrics relating to hosting the microservice (e.g., information relating to runtime, information relating to an amount of resources being used by the container or the replicate container, etc.). In some cases, computing nodes 226 can send information indicating a result of the health check to management node 222 when a threshold is satisfied, which can trigger management node 222 to downgrade the microservice.

Additionally, or alternatively, management node 222 can determine to add an amount of capacity available for a microservice of the one or more microservices, to add an amount of capacity available for a different microservice (e.g., a microservice not included in the one or more microservices), to remove an amount of capacity available to a microservice, or the like. For example, management node 222 can receive, from storage node 228, information associated with adding an amount of capacity available for a microservice, information associated with removing an amount of capacity available for a microservice, or the like. As an example, a health check can be performed on the one or more containers and/or the one or more replicate containers, in the same manner described above. In this case, storage node 228 can send a result of the health check to management node 222, which can trigger management node 222 to add an amount of capacity available for a microservice or can trigger management node 222 to remove an amount of capacity available for a microservice. Additionally, management node 222 can modify the microservice to resolve the performance issue identified by the information indicating the result of the health check, as described further herein.

Additionally, or alternatively, management node 222 can determine to add one or more additional replicate containers in a location that is geographically segregated from the one or more containers and the one or more replicate containers. For example, management node 222 can determine to add one or more replicate containers based on monitoring one or more network conditions. In this case, management node 222 can monitor the one or more network conditions (e.g., a rate at which a data center loses power) to determine that the microservices application might benefit from adding one or more additional replicate containers in a location that is geographically segregated from the one or more containers and the one or more replicate containers. As another example, a user associated with client device 210 can request that management node 222 deploy the additional replicate container in a geographic location that is different than the geographic location associated with the container or another replicate container.

As further shown in FIG. 4, process 400 can include modifying the one or more microservices based on the determination (block 440). For example, management node 222 can modify the one or more microservices by upgrading or downgrading the one or more microservices, adding an amount of capacity available for or reducing an amount of capacity available to the one or more microservices, deploying one or more additional replicate containers in a geographic location that is different than the geographic location associated with the one or more microservices, or the like. In some implementations, management node 222 can modify the one or more microservices seamlessly (i.e., the microservices application can remain online during the modifications). Additionally, management node 222 can deploy the one or more modified microservices. For example, management node 222 can deploy the one or more upgraded microservices, deploy the one or more downgraded microservices, or the like.

In some implementations, management node 222 can upgrade a microservice, of the one or more microservices, by replacing a container that is associated with the microservice with a different container that is associated with hosting the upgraded microservice. For example, assume management node 222 determines to upgrade the microservice (e.g., to upgrade to a new version of the microservice). In this case, management node 222 can obtain (e.g., download) the different container from the registry, and can provide (e.g., upload) the different container to the storage node 228 that hosts the container that is to be replaced.

Additionally, management node 222 can provide, to the storage node 228 that hosts the container that is to be replaced, an instruction to shut down the container, and the storage node 228 associated with the container can shut down the container. In this case, while the container is temporarily shut down, the instruction can cause the one or more replicate containers to manage traffic flow (e.g., I/O operations) associated with the microservice. The I/O operations can be stored using the distributed file system that is supported, in part, by the one or more replicate containers. As an example, while the container is shut down, client device 210 can communicate with host node 224 to perform I/O operations associated with the microservice, and host node 224 can make API calls to the storage nodes 228 that are associated with the one or more replicate containers (instead of to the storage node 228 associated with the container that is shut down). In this way, management node 222 improves reliability of the microservices application by providing data that can persist through modifications to the microservices application.

Additionally, the instruction to shut down the container can cause the one or more replicate containers to synchronize to the different container. For example, the one or more replicate containers can synchronize to the different container to provide information (e.g., metadata, data, etc.) associated with the traffic flow that is received while the container is shut down. In this case, the synchronization can allow the different container to support the distributed file system. In some implementations, the synchronize process can repeat to provide all storage nodes 228, associated with the microservices application, with the same information. Additionally, management node 222 can provide an instruction to the storage nodes 228 to deploy the different container, based on shutting down the container and synchronizing the different container.

In some implementations, management node 222 can upgrade a microservice, of the one or more microservices, by updating (rather than replacing) the container that is associated with the microservice. For example, management node 222 can provide an instruction to update the container that is associated with the microservice, and the storage node 228 that hosts the container can shut down the container, clear the container of metadata and data, and synchronize the container to the one or more replicate containers, in the same manner discussed above. In this case, the synchronization process can allow the container to support the distributed file system.

Additionally, or alternatively, management node 222 can downgrade a microservice, of the one or more microservices, by replacing a container that is associated with the microservice with a different container that is associated with hosting the downgraded microservice. For example, assume the registry stores an old version of the microservice (i.e., the downgraded microservice), and further assume that management node 222 determines to deploy the downgraded microservice. In this case, management node 222 can obtain the different container from the registry, and can provide the different container to the storage node 228 that hosts the container that is to be replaced.

Additionally, management node 222 can provide, to the storage node 228 that hosts the container that is to be replaced, an instruction to shut down the container, and the storage node 228 associated with the container can shut down the container. For example, while the container is shut down, the instruction can cause the one or more replicate containers to manage traffic flow (e.g., I/O operations) associated with the microservice. Additionally, the instruction to shut down the container can cause the one or more replicate containers to synchronize to the different container. For example, the one or more replicate containers can synchronize to the different container to provide information (e.g., metadata, data, etc.,) associated with the traffic flow that is received while the container is shut down. In this case, the synchronization can cause the different container to support the distributed file system. In some implementations, the synchronize process can repeat to provide all storage nodes 228, associated with the microservices application, with the same information. Additionally, management node 222 can provide an instruction to the storage node 228 to deploy the different container, based on shutting down the container and synchronizing the different container.

In some implementations, rather than accessing the registry to obtain a different container to host the downgraded microservice, computing node 226 can access an older version of the microservice via cache memory. By using cache memory instead of querying the registry, computing node 226 conserves network resources.

In some implementations, management node 222 can determine to upgrade a first microservice, of the one or more microservices, and can determine to downgrade a second microservice of the one or more microservices. For example, management node 222 can obtain a first set of containers associated with hosting the upgraded first microservice, and can obtain a second set of containers associated with hosting the downgraded second microservice. In this case, management node 222 can shut down a subset of the one or more containers that are associated with the first microservice and can shut down another subset of the one or more containers that are associated with the second microservice, based on obtaining the first set of containers and the second set of containers.

Additionally, management node 222 can provide, to a subset of the one or more replicate containers that are associated with the first microservice, an instruction to manage traffic flow associated with the first microservice. The instruction can cause the subset of the one or more replicate containers to manage the traffic flow associated with the first microservice. The instruction can further cause the subset of the one or more replicate containers to synchronize to the first set of containers to provide the first set of containers with information associated with the traffic flow. In this case, the synchronization can cause the first set of containers to support the distributed file system.

Furthermore, management node 222 can provide, to another subset of the one or more replicate containers that are associated with the second microservice, a different instruction to manage traffic flow associated with the second microservice. The different instruction can cause the other subset of the one or more replicate containers to manage the traffic flow associated with the second microservice. The different instruction can further cause the other subset of the one or more replicate containers to provide the second set of containers with information associated with the traffic flow. In this case, management node 222 can deploy the first set of containers and the second set of containers, based on shutting down the subset of the one or more containers associated with the first microservice and based on shutting down the other subset of the one or more containers associated with the second microservice.

Additionally, or alternatively, management node 222 can add an amount of capacity available for a microservice, of the microservices application, by adding one or more additional containers and/or one or more additional replicate containers. For example, management node 222 can add an amount of capacity available for a microservice based on obtaining one or more additional containers and one or more additional replicate containers, and based on applying a load balancing technique to the containers associated with the microservice (e.g., the one or more containers, the one or more replicate containers, the one or more additional containers, the one or more additional replicate containers, etc.). In this case, management node 222 can obtain the one or more additional containers and the one or more additional replicate containers from the registry, and can provide the one or more additional containers and the one or more additional replicate containers to a storage node 228 that is not presently hosting a container or a replicate container associated with the microservice.

Additionally, management node 222 can apply a load balancing technique to the one or more containers, the one or more replicate containers, the one or more additional containers, and/or the one or more additional replicate containers, to balance a distribution of resources of cloud computing environment 230. In some cases, the one or more additional containers and the one or more additional replicate containers can be synchronized with the one or more containers and the one or more replicate containers, in the same manner described above. Additionally, management node 222 can deploy the one or more additional containers, based on applying the load balancing technique.

Additionally, or alternatively, management node 222 can add an amount of capacity available for a different microservice (e.g., a microservice not presently included in the microservices application). For example, management node 222 can add an amount of capacity available for a different microservice based on obtaining one or more different containers and one or more different replicate containers (e.g., from the registry), and based on applying a load balancing technique to the one or more containers, the one or more replicate containers, the one or more different containers, and the one or more different replicate containers, to balance a distribution of cloud resources. In this case, management node 222 can deploy the one or more different containers and the one or more different replicate containers, based on applying the load balancing technique. In some cases, the one or more different containers and the one or more different replicate containers can be synchronized with the one or more containers and the one or more replicate containers, in the same manner described above.

Additionally, or alternatively, management node 222 can reduce an amount of capacity available to a microservice, of the microservices application, by removing one or more containers and/or one or more replicate containers associated with the microservice. For example, management node 222 can reduce an amount of capacity available to a microservice based on shutting down one or more containers and/or one or more replicate containers, and based on applying a load balancing technique to the containers and replicate containers associated with the microservices application.

As an example, assume a microservice is hosted by a first container, a second container, a first replicate container, and a second replicate container. Further assume that management node 222 receives information associated with reducing an amount of capacity available to the microservice (e.g., another microservice might require these resources). In this case, management node 222 can shut down the first container and the first replicate container (the first container and the first replicate container being associated with the microservice), and management node 222 can apply a load balancing technique to balance a distribution of cloud resources. Additionally, or alternatively, management node 222 can reduce an amount of capacity available to a new microservice that is being added to the microservices application, in the same manner described above.

In some cases, management node 222 can add an amount of capacity available for a first microservice by reducing an amount of capacity available for a second microservice. For example, assume management node 222 receives information associated with adding an amount of capacity available for a first microservice, of the one or more microservices. In this case, management node 222 can shut down (or provide a request to shut down) a first container and a first replicate container that are associated with a second microservice, of the one or more microservices. Additionally, management node 222 can apply a load balancing technique to reallocate resources associated with the second microservice to the first microservice (e.g., resources associated with the first container and the first replicate container). In this way, management node 222 maximizes computing resources by allocating and reallocating resources based on network activity.

Additionally, or alternatively, management node 222 can provide geographically segregated backup for the microservices application. For example, assume management node 222 receives a request to deploy one or more additional replicate containers at a geographic location that is different than the geographic location associated with the one or more containers and the one or more replicate containers. In this case, management node 222 can obtain, from the registry, the one or more additional replicate containers, and management node 222 can provide the one or more additional replicate containers to another management node associated with a different cloud platform, in the same manner described above. In this way, management node 222 improves reliability by providing a microservices application that can persist data in the event of a large power outage, a natural disaster, or the like.

Additionally, or alternatively, management node 222 can implement a modification to one or more microservices in a testing environment. For example, management node 222 can implement a modification using a simulated operating system environment (e.g., a sandbox environment) to verify that the one or more modified microservices can deploy without error. In this way, management node 222 can verify the accuracy of the modification prior to deployment, thereby improving reliability.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, cloud platform 220 reduces costs by eliminating a need for specialized hardware, and improves scalability and availability by providing persistent data and redundancy measures.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors, implemented at least partially in hardware, to:
receive information indicating a set of instructions associated with a microservices application,
the microservices application being associated with one or more microservices;
deploy one or more containers and one or more replicate containers,
the one or more containers and the one or more replicate containers being associated with the one or more microservices, and
provide an instruction to one or more computing nodes that are associated with the one or more replicate containers,
the instruction causing the one or more replicate containers to synchronize to the one or more containers to provide the one or more containers with metadata and data associated with traffic flow associated with the one or more microservices;
modify the one or more microservices based on information associated with modifying the one or more microservices based on deploying the one or more containers and the one or more replicate containers; and
deploy the one or more modified microservices.

2. The device of claim 1, where the one or more processors, when deploying the one or more containers and the one or more replicate containers, are to:
determine information relating to a network topology, and
deploy the one or more containers and the one or more replicate containers based on the information relating to the network topology.

3. The device of claim 1, where the one or more processors, when deploying the one or more containers and the one or more replicate containers, are to:
deploy the one or more containers in a first fault zone, and
deploy the one or more replicate containers in one or more second fault zones that are different than the first fault zone.

4. The device of claim 1, where the one or more processors, when receiving information associated with modifying the one or more microservices, are to:
receive, from a computing node that hosts a microservice of the one or more microservices, information indicating a result of a health check,
the result of the health check identifying a performance issue associated with the microservice; and
where the one or more processors, when modifying the one or more microservices, are to:
modify the microservice, of the one or more microservices, to resolve the performance issue identified by the information indicating the result of the health check.

5. The device of claim 1, where the one or more processors, when receiving the information associated with modifying the one or more microservices, are to:
receive a request to upgrade a microservice of the one or more of microservices; and
where the one or more processors, when modifying the one or more microservices, are to:
obtain a first container associated with hosting the upgraded microservice,
shut down a second container associated with the microservice based on obtaining the first container, and
deploy the first container based on shutting down the second container.

6. The device of claim 1, where the one or more processors, when receiving the information associated with modifying the one or more microservices, are to:
receive an instruction to upgrade a microservice associated with a first container and a corresponding first replicate container;
route traffic flow associated with the microservice to the first replicate container, and not to the first container;
shut down the first container;
replace the first container with a second container associated with an upgraded version of the microservice; and
synchronize the first replicate container with the second container.

7. The device of claim 1, where the one or more processors, when receiving the information associated with modifying the one or more microservices, are to:
receive information associated with adding an amount of capacity available for a microservice of the one or more microservices; and
where the one or more processors, when modifying the one or more microservices, are to:
obtain one or more additional containers and one or more additional replicate containers,
apply a load balancing technique to the one or more containers, the one or more replicate containers, the one or more additional containers, and the one or more additional replicate containers to balance a distribution of resources, and
deploy the one or more additional containers and the one or more additional replicate containers based on applying the load balancing technique.

8. A non-transitory computer-readable medium storing instructions, the instructions comprising:
one or more instructions that, when executed by one or more processors implemented at least partially in hardware, cause the one or more processors to:
determine to host a microservices application,
the microservices application being associated with one or more microservices;
deploy one or more containers and one or more replicate containers based on determining to host the microservices application,
provide an instruction, to one or more computing nodes that are associated with the one or more replicate containers,
the instruction causing the one or more replicate containers to synchronize to the one or more containers to provide the one or more containers with metadata and data associated with traffic flow associated with the one or more microservices;
modify the one or more microservices based on information associated with modifying the one or more microservices based on deploying the one or more containers and the one or more replicate containers; and
deploy the one or more modified microservices.

9. The non-transitory computer-readable medium of claim 8, where the one or more instructions, that cause the one or more processors to receive the information associated with modifying the one or more microservices, cause the one or more processors to:
receive a request to upgrade the one or more microservices; and where the one or more instructions, that cause the one or more processors to modify the one or more microservices, cause the one or more processors to:
   obtain one or more first containers associated with hosting the one or more microservices,
   shut down one or more second containers that are associated with the one or more microservices based on obtaining the one or more first containers, and
   deploy the one or more first containers based on shutting down the one or more second containers.

10. The non-transitory computer-readable medium of claim 8, where the one or more instructions, that cause the one or more processors to deploy the one or more containers and the one or more replicate containers, cause the one or more processors to:
   deploy the one or more containers in a first fault zone, and
   deploy the one or more replicate containers in one or more second fault zones that are different from the first fault zone.

11. The non-transitory computer-readable medium of claim 8, where the one or more instructions, that cause the one or more processors to receive the information associated with modifying the one or more microservices, cause the one or more processors to:
   receive an instruction to upgrade a microservice associated with a first container and a corresponding first replicate container;
   route traffic flow associated with the microservice to the first replicate container, and not to the first container;
   shut down the first container;
   replace the first container with a second container associated with an upgraded version of the microservice; and
   synchronize the first replicate container with the second container.

12. The non-transitory computer-readable medium of claim 8, where the one or more instructions, when executed by the one or more processors, further cause the one or more processors to:
   provide an instruction to a first microservice to perform a task,
      wherein the first microservice is unable to perform a related task,
      wherein a second microservice is able to perform the related task, and
      wherein the first microservice makes an application programming interface call to the second microservice to perform the related task.

13. The non-transitory computer-readable medium of claim 8, where the one or more instructions, that cause the one or more processors to receive information associated with modifying the one or more microservices, cause the one or more processors to:
   receive information associated with adding an amount of capacity available for a different microservice,
      the different microservice being separate from the one or more microservices; and
   where the one or more instructions, when executed by the one or more processors, further cause the one or more processors to:
      obtain one or more different containers and one or more different replicate containers;
      apply a load balancing technique to the one or more containers, the one or more replicate containers, the one or more different containers, and the one or more different replicate containers to balance a distribution of resources; and
      deploy the one or more different containers and the one or more different replicate containers based on applying the load balancing technique.

14. The non-transitory computer-readable medium of claim 8, where the one or more instructions, that cause the one or more processors to receive the information associated with modifying the one or more microservices, cause the one or more processors to:
   receive a request to deploy one or more additional replicate containers at a first geographic location that is different than a second geographic location associated with the one or more containers and the one or more replicate containers; and
   where the one or more instructions, when executed by the one or more processors, further cause the one or more processors to:
      deploy the one or more additional replicate containers at the first geographic location.

15. A method, comprising:
   receiving, by a device, information indicating a set of instructions associated with a microservices application,
      the microservices application being associated with one or more microservices;
   determining, by the device, information relating to a network topology;
   deploying, by the device, one or more containers and one or more replicate containers based on the information indicating the set of instructions associated with the microservices application and based on determining the information relating to the network topology,
   providing an instruction, by the device, to one or more computing nodes that are associated with the one or more replicate containers,
      the instruction causing the one or more replicate containers to synchronize to the one or more containers to provide the one or more containers with metadata and data associated with traffic flow associated with the one or more microservices;
   determining, by the device, to modify one or more microservices based on deploying the one or more containers and the one or more replicate containers;
   modifying, by the device, the one or more microservices, based on determining to modify the one or more microservices; and
   deploying, by the device, the one or more modified microservices.

16. The method of claim 15, where deploying the one or more containers and the one or more replicate containers comprises:
   deploying the one or more containers in a first fault zone, and
   deploying the one or more replicate containers in one or more second fault zones that are different than the first fault zone.

17. The method of claim 15, where determining to modify the one or more microservices comprises:
   determining to upgrade a first microservice of the one or more microservices, and
   determining to downgrade a second microservice of the one or more microservices; and
   where modifying the one or more microservices comprises:
      obtaining a first set of containers associated with hosting the upgraded first microservice and a second set of containers associated with hosting the downgraded second microservice, shutting down a subset of the one or more containers that are associated with the first microservice and shutting down another subset of the one or more containers that are associated with the second microservice based on obtaining the first set of containers and the second set of containers, and deploying the first set of containers and the second set of containers based on shutting down the subset of the one or more containers associated with the first microservice and the other subset of the one or more containers associated with the second microservice.

18. The method of claim 17, further comprising:

providing, to a subset of the one or more replicate containers that are associated with the first microservice, an instruction to manage traffic flow associated with the first microservice, the instruction to cause the subset of the one or more replicate containers to manage the traffic flow associated with the first microservice, and the instruction to cause the subset of the one or more replicate containers to provide the first set of containers with information associated with the traffic flow; and providing, to another subset of the one or more replicate containers that are associated with the second microservice, a different instruction to manage traffic flow associated with the second microservice, the different instruction to cause the other subset of the one or more replicate containers to manage the traffic flow associated with the second microservice, and the different instruction to cause the other subset of the one or more replicate containers to provide the second set of containers with information associated with the traffic flow.

19. The method of claim 15, where determining to modify the one or more microservices comprises:

receiving information associated with adding an amount of capacity available for a microservice of the one or more microservices; and where modifying the one or more microservices comprises:

obtaining one or more additional containers and one or more additional replicate containers, applying a load balancing technique to at least one of the one or more containers, the one or more replicate containers, the one or more additional containers, or the one or more additional replicate containers to balance a distribution of network resources, and deploying the one or more additional containers and the one or more additional replicate containers based on applying the load balancing technique.

20. The method of claim 15, where determining to modify the one or more microservices comprises:

receiving information associated with adding an amount of capacity available for a first microservice, of the one or more microservices; and where modifying the one or more microservices comprises:

shutting down a first container, and a first replicate container, the first container and the first replicate container being associated with a second microservice, of the one or more microservices, and applying a load balancing technique to reallocate resources associated with the second microservice to the first microservice.

\* \* \* \* \*